United States Patent
Adiththan et al.

(10) Patent No.: US 12,441,242 B2
(45) Date of Patent: Oct. 14, 2025

(54) SYSTEM AND METHOD FOR DETECTING A TRAILER COUPLER AND PLANNING A TRAJECTORY

(71) Applicant: GM Global Technology Operations LLC, Detroit, MI (US)

(72) Inventors: Arun Adiththan, Sterling Heights, MI (US); Md Mhafuzul Islam, Warren, MI (US); Prakash M. Peranandam, Rochester Hills, MI (US); Ramesh Sethu, Troy, MI (US); Azeem Sarwar, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 105 days.

(21) Appl. No.: 18/528,908

(22) Filed: Dec. 5, 2023

(65) Prior Publication Data
US 2025/0178528 A1  Jun. 5, 2025

(51) Int. Cl.
*B60R 1/00* (2022.01)
*G06V 20/56* (2022.01)

(52) U.S. Cl.
CPC .............. *B60R 1/003* (2013.01); *G06V 20/56* (2022.01)

(58) Field of Classification Search
CPC .......... B60K 2360/166; B60K 2360/21; B60K 35/10; B60K 35/28; B60R 1/26; B60R 2300/808; B60R 1/003; G06T 2207/20081; G06T 2207/30252; G06T 7/73; G06V 20/56
See application file for complete search history.

(56) References Cited

U.S. PATENT DOCUMENTS

| | | | |
|---|---|---|---|
| 7,904,222 B2 * | 3/2011 | Lee .................. | G08G 1/167 701/41 |
| 9,696,723 B2 * | 7/2017 | Zeng .................. | B60D 1/36 |
| 11,427,199 B2 * | 8/2022 | Niewiadomski ...... | B60W 10/18 |
| 2014/0012465 A1 * | 1/2014 | Shank ................ | B60D 1/58 701/36 |

(Continued)

FOREIGN PATENT DOCUMENTS

| | | | | |
|---|---|---|---|---|
| CA | 3063011 A1 * | 5/2020 | ......... | B62D 15/0285 |
| CN | 113715565 B * | 7/2024 | ............... | B60R 1/26 |

(Continued)

*Primary Examiner* — Babar Sarwar
(74) *Attorney, Agent, or Firm* — Vivacqua Crane, PLLC

(57) ABSTRACT

A system and method for locating a trailer coupler on a trailer to assist with the coupling of the trailer coupler to a vehicle hitch on a vehicle. The system includes a human-machine interface, a vehicle camera and a trailer camera, a mobile device application (App) with access to camera and mobile network a vehicle-to-infrastructure communication network, controllers, a memory, sensors, and a trailer detection and trajectory planning application. The application includes: initializing a data stream from the vehicle and trailer camera, capturing the data stream from the vehicle camera and from the trailer camera, determining key landmarks in the data stream, combining the key landmarks, determining a coupler location, computing a joint reference trajectory using the coupler location, and providing navigation assistance in real time based on the joint reference trajectory.

20 Claims, 5 Drawing Sheets

(56) References Cited

U.S. PATENT DOCUMENTS

| | | | | |
|---|---|---|---|---|
| 2015/0115571 | A1* | 4/2015 | Zhang | B60D 1/36 |
| | | | | 280/477 |
| 2016/0052548 | A1* | 2/2016 | Singh | G06V 20/58 |
| | | | | 701/41 |
| 2016/0288601 | A1* | 10/2016 | Gehrke | B60Q 5/006 |
| 2016/0304122 | A1* | 10/2016 | Herzog | B62D 15/0295 |
| 2016/0375831 | A1* | 12/2016 | Wang | G06F 3/048 |
| | | | | 348/148 |
| 2018/0029429 | A1* | 2/2018 | Janardhana | B62D 15/028 |
| 2018/0039278 | A1* | 2/2018 | Hüger | G05D 1/0223 |
| 2018/0081370 | A1* | 3/2018 | Miller | B60W 10/04 |
| 2018/0181142 | A1* | 6/2018 | Baran | B60D 1/36 |
| 2018/0312022 | A1* | 11/2018 | Mattern | B60W 30/18036 |
| 2019/0176699 | A1* | 6/2019 | Naserian | B60W 30/095 |
| 2019/0339704 | A1* | 11/2019 | Yu | G06T 7/66 |
| 2020/0039517 | A1* | 2/2020 | Berkemeier | B60W 30/18036 |
| 2020/0175311 | A1* | 6/2020 | Xu | G06V 10/82 |
| 2020/0238912 | A1* | 7/2020 | Sakakibara | B60R 1/28 |
| 2021/0129752 | A1* | 5/2021 | Raeis Hosseiny | B60W 10/20 |
| 2021/0291832 | A1* | 9/2021 | Simmons | B60K 35/28 |
| 2021/0347410 | A1* | 11/2021 | Niewiadomski | B62D 15/021 |
| 2022/0084212 | A1* | 3/2022 | Dahal | G06N 3/08 |
| 2022/0138476 | A1* | 5/2022 | Niewiadomski | G06T 7/20 |
| | | | | 382/181 |
| 2023/0143282 | A1* | 5/2023 | Niedert | G01L 5/136 |
| | | | | 280/446.1 |
| 2023/0219601 | A1* | 7/2023 | Nagraj Rao | G06V 10/764 |
| | | | | 701/23 |
| 2023/0230387 | A1* | 7/2023 | Herman | G06V 20/56 |
| | | | | 701/25 |
| 2024/0190342 | A1* | 6/2024 | Assa | B60R 1/26 |
| 2024/0359690 | A1* | 10/2024 | Li | B60D 1/36 |
| 2025/0128661 | A1* | 4/2025 | Sconce | B60D 1/06 |

FOREIGN PATENT DOCUMENTS

| | | | | |
|---|---|---|---|---|
| DE | 102010035299 A1 | | 2/2012 | |
| DE | 102019129193 A1 | * | 4/2020 | B62D 15/025 |
| DE | 102019131259 A1 | * | 5/2020 | B60D 1/363 |
| DE | 102021100251 A1 | | 7/2021 | |
| DE | 102021212050 A1 | | 5/2022 | |
| EP | 3790745 B1 | * | 8/2023 | G05D 1/0246 |
| WO | WO-2022246477 A1 | * | 11/2022 | B62D 15/0285 |

* cited by examiner

SYSTEM AND METHOD FOR DETECTING A TRAILER COUPLER AND PLANNING A TRAJECTORY

INTRODUCTION

The present disclosure relates to advanced driver assistance systems (ADAS), and more particularly to driver assistance systems that detect a trailer coupler used to couple a trailer to a vehicle and that provide trajectory planning and navigation assistance.

Vehicles are often used to tow trailers to carry equipment, goods, belongings, animals, other vehicles including boats and off-road vehicles, from place to place along roadways. Vehicles are equipped with hitches that removably couple to a trailer coupler of a trailer. Coupling the trailer coupler to a vehicle hitch can be difficult and require backing up the vehicle with limited operator vision.

Accordingly, trailer coupler identification systems have been developed to assist in locating the trailer coupler on the trailer. For example, some ADAS employ an electronic tag, marker, or ID placed on the trailer coupler that is easily identifiable by the vehicle's computer vision system of the ADAS. ADAS that assist with backing are often only effective at close range (e.g., <3 feet), require a marker, and often only utilize one camera in the computer vision system. While current systems and methods for trailer coupler detection and navigation assistance achieve their intended purpose, there is a need for a system and method of trailer coupler detection and navigation assistance that improves the accuracy of locating the trailer coupler on a trailer when backing a vehicle, reducing computational burdens, and reducing component complexity while decreasing trailer coupling difficulty, and thereby improving operator confidence and satisfaction.

SUMMARY

According to several aspects of the present disclosure, a system for detecting a trailer coupler on a trailer to assist with coupling the trailer coupler to a vehicle hitch is provided. The system includes at least one human-machine interface (HMI) disposed within the vehicle, a vehicle camera disposed on the vehicle and detecting an environment surrounding the vehicle, a trailer camera disposed on the trailer and detecting an environment surrounding the trailer, a vehicle-to-infrastructure (V2I) communication network, a mobile device application (App) with access to camera and mobile network and one or more controllers. Each of the one or more controllers has a processor, a memory, and one or more input/output (I/O) ports, the I/O ports in communication with the vehicle camera and the trailer camera, and the one or more HMIs via the V2I communication network. The memory stores instructions including a trailer detection and trajectory planning application (DTPA). The DTPA includes instructions that initialize a data stream from the vehicle camera and the trailer camera that can be a mobile device with camera running the OEM App positioned in the trailer, simultaneously capture the data stream from the vehicle camera and from the trailer camera, determine key landmarks in the data stream from the vehicle camera and in the data stream from the trailer camera, combine the key landmarks, determine a coupler location with respect to the vehicle hitch using combined key landmarks, compute a joint reference trajectory using the coupler location with respect to the hitch location, and provide navigation assistance in real time based on the joint reference trajectory.

In another aspect of the present disclosure, the trailer camera is a cell phone camera in communication with a mobile application.

In yet another aspect of the present disclosure, the one or more controllers is located in the vehicle and at the trailer.

In yet another aspect of the present disclosure, the one or more controllers is located at a remote computing system.

In yet another aspect of the present disclosure, the system includes instructions that further request an operator to provide an input to the HMI to confirm initialization of the DTPA.

In yet another aspect of the present disclosure, the system includes instructions that perform key landmark detection and dimensional calculations on the captured data stream to determine the location of the trailer coupler in real time.

In yet another aspect of the present disclosure, the system further includes instructions for presenting navigation assistance including at least one of verbal or visual navigation assistance to the HMI to guide the vehicle hitch to the trailer coupler.

In yet another aspect of the present disclosure, the system further includes instructions for providing navigation assistance including automated steering assistance.

In yet another aspect of the present disclosure, a method for detecting location of a trailer coupler on a trailer and assisting with the coupling of the trailer coupler to a vehicle hitch on a vehicle is provided. The method includes initializing a data stream from the vehicle camera and the trailer camera, capturing the data stream from the vehicle camera and from the trailer camera, determining key landmarks in the data stream from the vehicle camera and in the data stream from the trailer camera, combining the key landmarks, determining a coupler location with respect to the vehicle hitch using combined key landmarks, computing a joint reference trajectory using the coupler location with respect to the hitch location, and providing navigation assistance in real time based on the joint reference trajectory.

In yet another aspect of the present disclosure the method further includes requesting an operator to provide an input to the HMI.

In yet another aspect of the present disclosure the method further includes providing a remote computing system, wherein the I/O ports are in communication with the remote computing system via the V2I communication network.

In yet another aspect of the present disclosure the method further includes capturing the data stream while simultaneously capturing video stream from the vehicle camera and from the trailer camera.

In yet another aspect of the present disclosure the method includes presenting the navigation assistance in real time and presenting at least one of verbal or visual assistance using the one or more human-machine interfaces.

In yet another aspect of the present disclosure the method further includes presenting the navigation assistance in real time and providing steering assistance.

In yet another aspect of the present disclosure the method further includes determining key landmarks in the data stream from the vehicle camera and in the data stream from the trailer camera using the processor in the vehicle.

In yet another aspect of the present disclosure the method further includes determining key landmarks in the data stream from the vehicle camera and in the data stream from the trailer camera using a processor in the vehicle and in a processor in the trailer.

In yet another aspect of the present disclosure the method further includes determining key landmarks in the data stream from the vehicle camera and in the data stream from the trailer camera using the controller in a remote computer.

In yet another aspect of the present disclosure the method includes the trailer camera being a mobile device camera located at the trailer coupler.

In yet another aspect of the present disclosure, a method for detecting location of a trailer coupler on a trailer and assisting with the coupling of the trailer coupler to a vehicle hitch on a vehicle is provided. The method includes requesting an operator to provide an input to the HMI, initializing a data stream from the vehicle camera and the trailer camera, capturing the data stream from the vehicle camera and from the trailer camera, determining key landmarks in the data stream from the vehicle camera and in the data stream from the trailer camera in real time, combining the key landmarks determined from the data stream from the vehicle camera and from the data stream from the trailer camera, and determining a coupler location with respect to the vehicle hitch using combined key landmarks. The DTPA also includes control logic for: actively and dynamically computing a joint reference trajectory using the coupler location with respect to the hitch location, and actively and continuously presenting navigation assistance in real time based on the joint reference trajectory, wherein the navigation assistance includes automated steering assistance.

In yet another aspect of the present disclosure the method includes navigation assistance with verbal and visual instruction displayed on the one or more HMIs.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
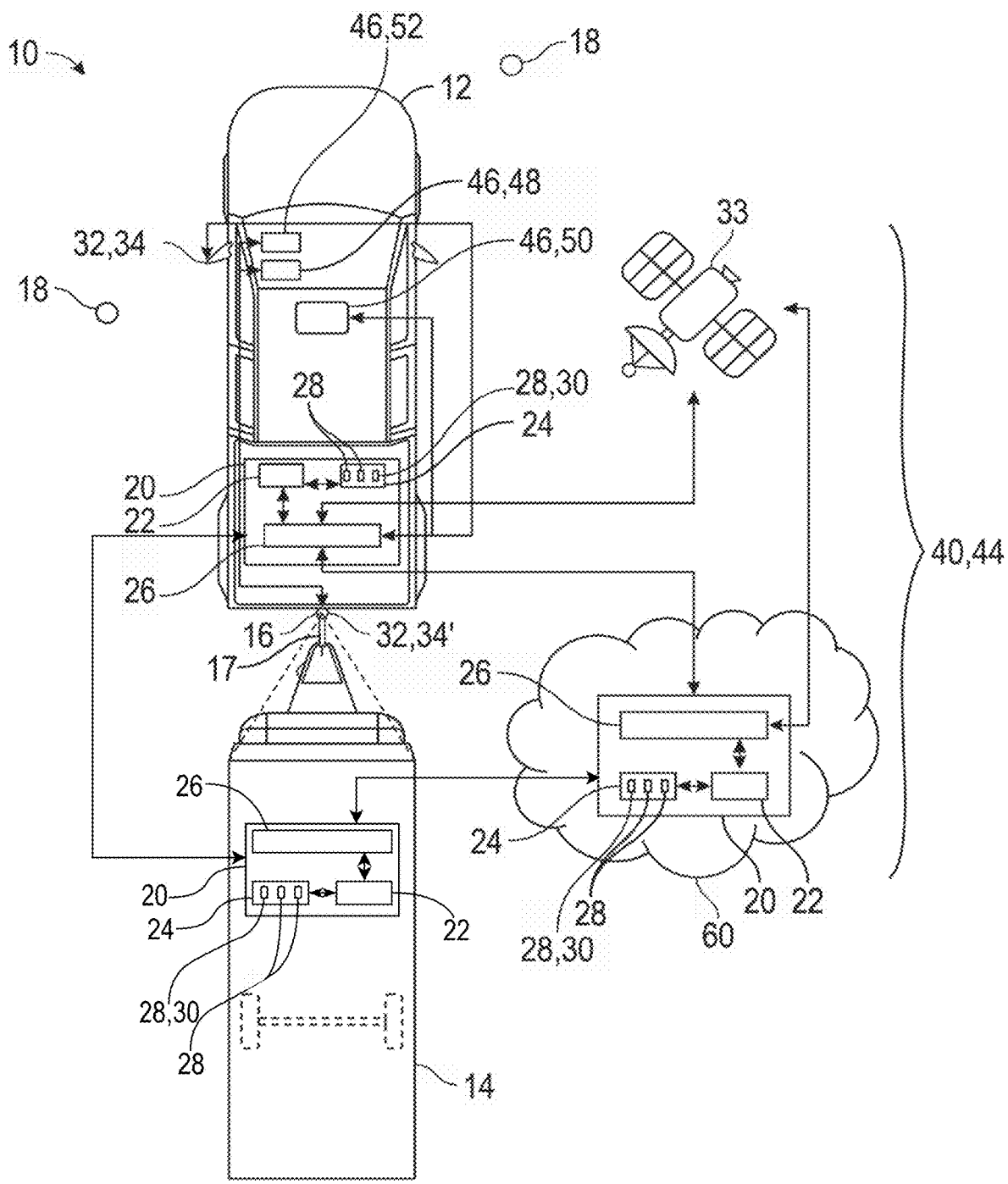
FIG. 1 is a schematic view of a system to detect a trailer coupler on a trailer to assist with coupling the trailer coupler to a vehicle hitch, in accordance with an exemplary embodiment.

Referring to FIG. 1, a schematic diagram of a system 10 for detecting a trailer coupler and planning a trajectory from a vehicle hitch to the trailer coupler is shown. The system 10 includes a vehicle 12 and a trailer 14 attachable via a hitch 16 to the vehicle 12. While the vehicle 12 is shown as a passenger car or sport utility vehicle (SUV), it should be appreciated that the vehicle 12 may be any type of vehicle without departing from the scope or intent of the present disclosure. In some examples, the vehicle 12 may be a car, a truck, an SUV, a bus, a semi tractor, a tractor used in farming or construction or the like, a pushback tractor or tug, a baggage tractor or cargo tow tractor, or the like. Likewise, while the trailer 14 shown in FIG. 1 is a single-axle trailer, the trailer 14 may be any of a wide variety of trailer 14 types without departing from the scope or intent of the present disclosure. In some examples, the trailer 14 may be an enclosed or open-air trailer 14 including flatbed trailers, dry vans, refrigerated trailers, lowboy trailers, fifth wheel campers, gooseneck trailers, luggage or cargo trailers, or the like. In further examples, the trailer 14 may be another vehicle 12 as described above, or a vehicle 12 such as a plane, helicopter, or other such aircraft. That is, a vehicle 12 may tow another vehicle 12 as a trailer 14, and multiple trailers 14 may be towed together in single file, or in parallel with one another.

The trailer 14 is attachable or mountable to the vehicle 12 via a hitch 16 on the vehicle 12 and a trailer coupler 17 on the trailer 14. The hitch 16 and trailer coupler 17 allow rotational movement of the trailer 14 relative to the vehicle 12, thus providing the trailer 14 and vehicle 12 means to negotiate turns while in motion. The hitch 16 depicted in FIG. 1 is a ball hitch, however it should be appreciated that other forms of hitches 16 may be used without departing from the scope or intent of the present disclosure. For example, the hitch 16 may be a ball hitch, a receiver hitch, a fifth wheel hitch, a gooseneck hitch, a pintle hitch, a bumper hitch, a weight distribution hitch, or the like. In several aspects, the hitch 16 operates as a pivot. It is desirable while attempting to couple the trailer to the vehicle to manage vehicle 12 such that the vehicle 12 does not physically contact the trailer or obstacles in the environment 18 surrounding the vehicle 12 and trailer 14 when the vehicle 12 is in reverse and backing towards the trailer 14.

The system 10 includes one or more controllers 20. The controller 20 is a non-generalized, electronic control device having a preprogrammed digital computer or processor 22, non-transitory computer readable medium or memory 24 used to store data such as control logic, software applications, instructions, computer code, data, lookup tables, etc., and one or more input/output (I/O) ports 26. Computer readable medium includes any type of medium capable of being accessed by a computer, such as read only memory (ROM), random access memory (RAM), a hard disk drive, a compact disc (CD), a digital video disc (DVD), or any other type of memory. The non-transitory computer readable medium or memory 24 includes media where data can be permanently stored and media where data can be stored and later overwritten, such as a rewritable optical disc or an erasable memory device. Computer code includes any type of program code, including source code, object code, and executable code. The processor 22 is configured to execute the code or instructions. In some examples, the controller 20 may be a dedicated Wi-Fi controller or an engine control module, a transmission control module, a body control module, an infotainment control module, etc. The I/O ports 26 are configured to communicate via wired or wireless connections using Wi-Fi protocols under IEEE 802.11x, Bluetooth communication protocols, radio frequency (RF) protocols, or the like. In some examples, the controller 20 further includes one or more applications 28. An application 28 is a software program configured to perform a specific function or set of functions. The application 28 may include one or more computer programs, software components, sets of instructions, procedures, functions, objects, classes, instances, related data, or a portion thereof adapted for implementation in a suitable computer readable program code. The application 28 may be stored within the memory 24 or in additional or separate memory. Examples of applications 28 include audio or video streaming services, games, browsers, social media, suspension and engine control programs, body control programs, advanced driver assistance system (ADAS) programs, and the like. In a particular application 28 of the present disclosure, the system 10 includes a trailer detection and trajectory planning application (DTPA) 30.

System 10 further includes one or more sensors 32. The sensors 32 produce real-time positioning and detection information regarding the location and/or movement of the vehicle 12. In the example provided, the sensors 32 include vehicle cameras 34 and trailer camera 34'. The vehicle camera 34 is fixed to a rear of the vehicle 12 that has a field of view to the rear of the vehicle 12. Alternatively, the vehicle camera 34 may be located on a side view or rear-view mirror of the vehicle 12. The trailer camera 34' may be located at the coupler 17 or other location of the trailer 14. However, the sensors 32 may include any of a wide variety of different types of sensors 32, including but not limited to: Light Detection and Ranging (LiDAR) sensors, Radio Detection and Ranging (RADAR) sensors, Sound Navigation and Ranging (SONAR) sensors, ultrasonic sensors, or combinations thereof. Further, the sensors 32 may have the ability to communicate with a Global Positioning System (GPS), and in particular, image data collected by satellites 33 in orbit around Earth, in order to more accurately and precisely report the location of the vehicle 12. In further examples, the sensors 32 may include wheel speed sensors disposed on one or more of the vehicle 12 and the trailer 14, or a hitch angle estimation sensor usable with a hitch angle estimation algorithm.

In additional examples, the sensors 32 may include inertial measurement units (IMUs). IMUs measure and report attitude or position, linear velocity, acceleration, and angular rates relative to a global reference frame using a combination of some or all the following: accelerometers, gyroscopes, and magnetometers. In some examples, IMUs may also utilize global positioning system (GPS) data to indirectly measure attitude or position, velocity, acceleration, and angular rates. When used in the system 10 of the present disclosure, the IMUs measure and report attitude or position, linear velocity, acceleration, and angular rates the vehicle 12 and vehicle camera 34. The controllers 20 and sensors 32 may be linked to and communicate on one or more communications networks 40 including one or more of a vehicle-to-vehicle (V2V) communications network, a vehicle-to-infrastructure (V2I) communications network 44 (a remote computing system), or the like. For the sake of brevity, the term "infrastructure" is used to collectively refer to network entities capable of Ad hoc wireless communications in the direct link or side link, and the cellular communication network owned by service providers, hence vehicle-to-network (V2N) communication is also intended to be included in the scope of V2I.

Figure 2:
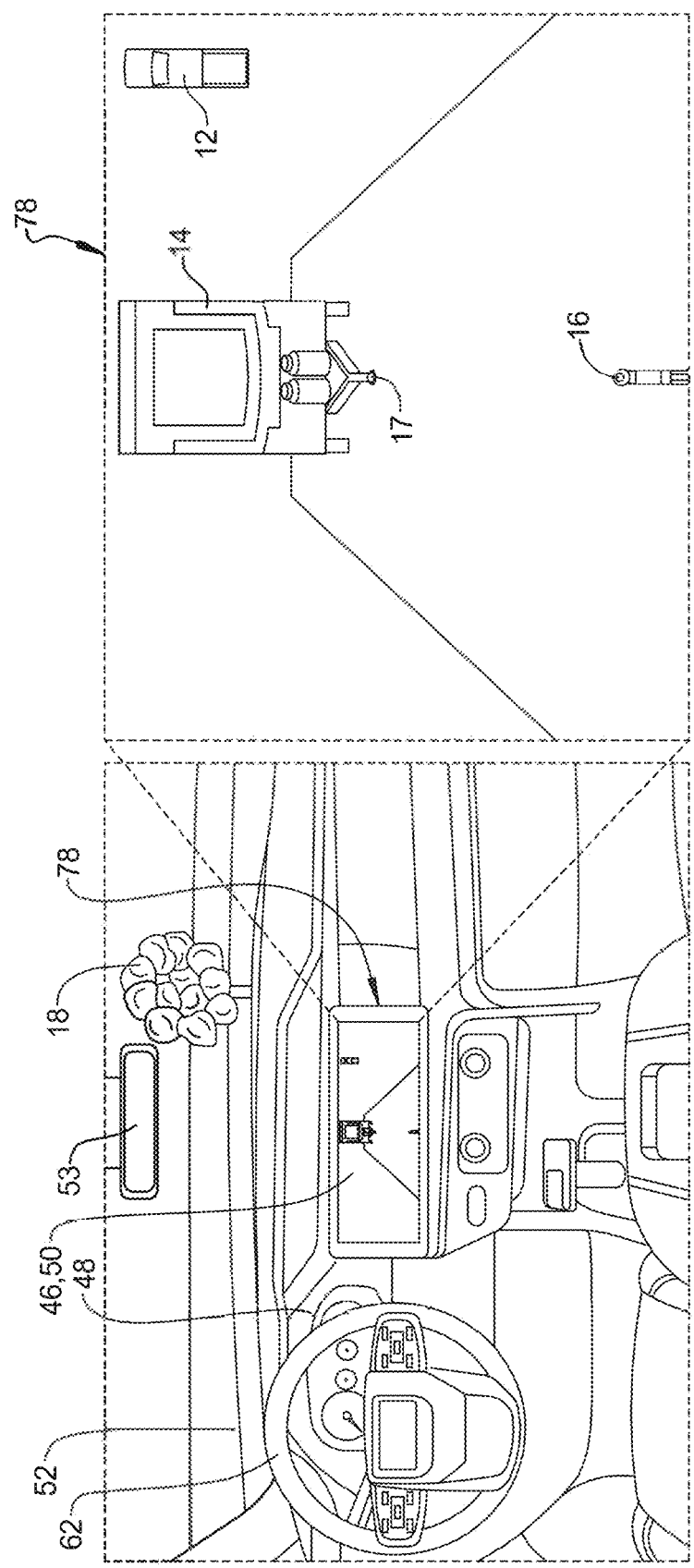
FIG. 2 is a perspective interior view of a vehicle, including a human-machine interface (HMI) displaying a view of an environment surrounding a vehicle utilizing the system to detect a trailer coupler on a trailer to assist with coupling the trailer coupler to the vehicle hitch of FIG. 1, in accordance with an exemplary embodiment.

Referring now to FIG. 2 and with continuing reference to FIG. 1, the system 10 further includes a human-machine interface (HMI) 46 disposed within the vehicle 12 to interact with an operator of the vehicle 12. In several aspects, the HMI 46 includes one or more devices capable of interacting with the operator, such as a screen disposed within the vehicle 12 such as an instrument cluster 48, an infotainment screen 50, a heads-up display (HUD) 52, an interior rear-view screen such as a rear-view mirror augmented by a screen 53, a sound delivery system, speakers, a microphone, or the like. However, it should be appreciated that other HMIs 46 are considered herein as well. For example, the HMI 46 may be a mobile device, such as a tablet computer, a mobile phone, a cell phone in communication with the DTPA and running an original equipment manufacturer (OEM) app positioned at the trailer 14, or the like, and the HMI 46 may be provided by the operator and temporarily mounted to or disposed on an interior passenger compartment component of the vehicle 12. In several aspects, the HMI 46 communicates with the controllers 20 via the I/O ports 26 and sends information to and receives information from the I/O ports 26 of the controllers 20, including during operation of the DTPA 30.

For example, the DTPA 30 in combination with other vehicle control applications may assist a vehicle 12 operator in maneuvering the vehicle 12 by providing verbal (e.g., via a vehicle speaker) or visual instruction (e.g., via HMI 46, HUD 52, and the like) to the operator or causing a steering wheel 62 to rotate (e.g., automated steering assistance) and direct the vehicle 12 towards trailer 14 as it moves toward the trailer 14 to attach, hitch or couple the trailer 14 to the vehicle 12. The verbal and/or visual assistance can be configured by an operator in the HMI 46 or an application (e.g., OnStar) in-vehicle 12 and/or an application at the trailer 14 (e.g., a mobile phone using OnStar). More specifically, the DTPA 30 includes a plurality of sub-routines or instructions that are stored in memory 24 of the controllers 20 and executed by the processor 22 while data is received, via the I/O ports 26, from the sensors 32 such as the vehicle camera 34 and the trailer camera 34', hitch angle estimation sensor, IMUs, and/or satellites 33 reporting GPS data. The DTPA 30 further includes a plurality of subroutines or instructions that cause data to be transmitted from the controllers 20 to the HMI 46.

Figure 3:
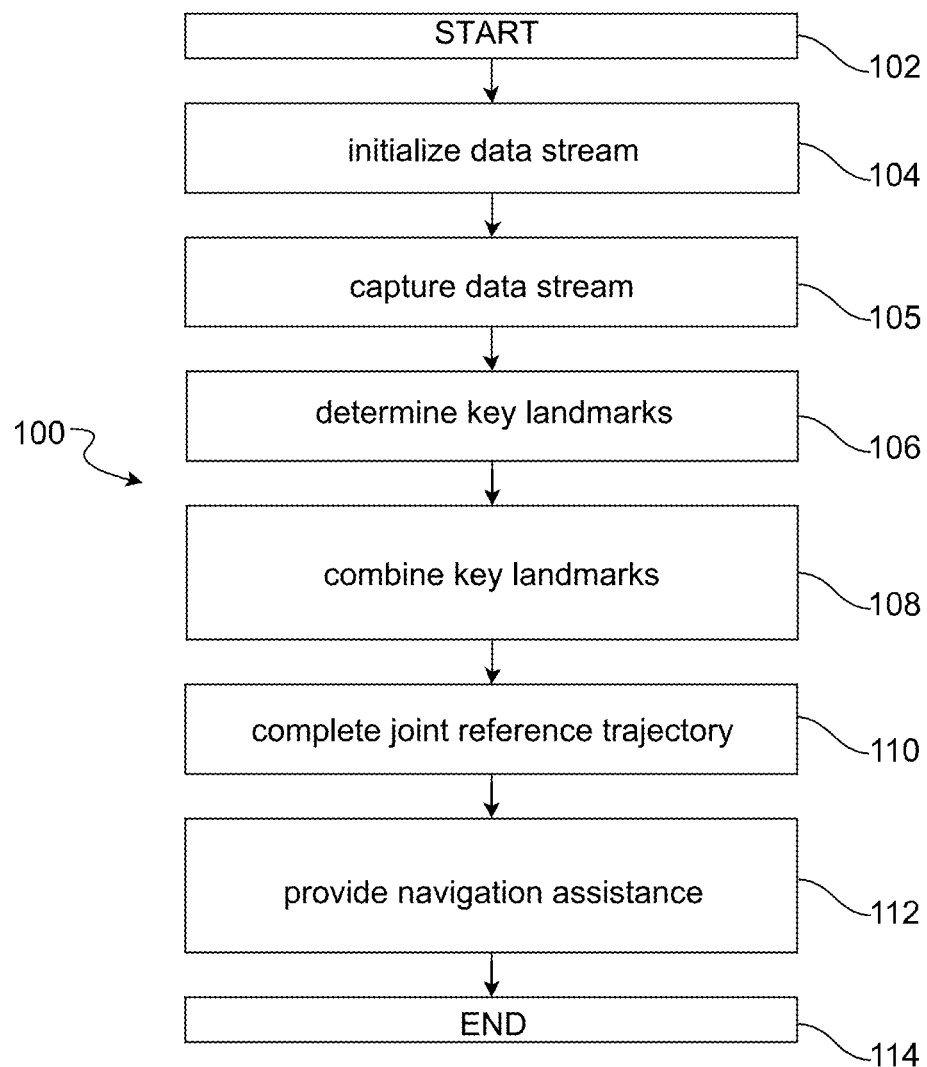
FIG. 3 is a flowchart of a method for implementing a trailer detection and navigation assistance application using the system of FIG. 1, in accordance with an exemplary embodiment.

With reference now to FIG. 3, a flowchart of a method 100 of the DTPA 30 is shown, in accordance with the present disclosure. The DTPA 30 is initialized or started at block 102 when one or more specific conditions occur. The specific conditions include manual initialization by the operator via the HMI 46 or the operation of a physical button disposed in the interior of the vehicle 12. In further examples, the conditions may be automatically satisfied by sensors 32 and/or the vehicle camera 34 and the trailer camera 34' detecting that a trailer 14 is proximate but not coupled to the vehicle 12. The method 100 then proceeds to block 104.

At block 104, upon receiving confirmation at block 102 that the operator desires to engage the DTPA 30, the controller 20 utilizes the HMI 46 to present a prompt to the operator for confirmation that the operator desires that the DTPA 30 be engaged or to request that the operator provide an input to the HMI 46. The prompt may be displayed on-screen on the HMI 46, HUD 52, dictated audibly through a stereo system of the vehicle 12, or the like. The method 100 then proceeds to block 105.

At block 105, the data stream starts and is received by the controller 20 from the vehicle camera 34 and the trailer camera 34'. The data stream includes video data or image frames from the video data, graphic data, or other data from the vehicle camera 34 and the trailer camera 34'. The controller receives the data stream simultaneously and in real time from both the vehicle camera 34 and the trailer camera 34'. The method then proceeds to block 106.

At block 106, the DTPA 30 uses a visual simultaneous localization and mapping (vSLAM, Co-SLAM, Multi-Co-SLAM) algorithm that uses visual, video, and/or optical data to capture the data stream from the vehicle camera 34 and the trailer camera 34' and determine key landmarks. Environmental and key landmark scan data received from the vehicle camera 34 and the trailer camera 34' is processed in one or more image or video-processing algorithms (e.g., vSLAM). In several aspects, the image or video-processing algorithms may include one or more of image capture algorithms that capture an image of the trailer 14 and trailer coupler 17 from the video data stream and perform image distortion corrections as needed to correct for camera 34, 34' lens shape, and the like. Feature or landmark detection algorithms, such as Canny Edge algorithms, performs feature or landmark detection within the image of the trailer 14 and trailer coupler 17.

Figure 4:
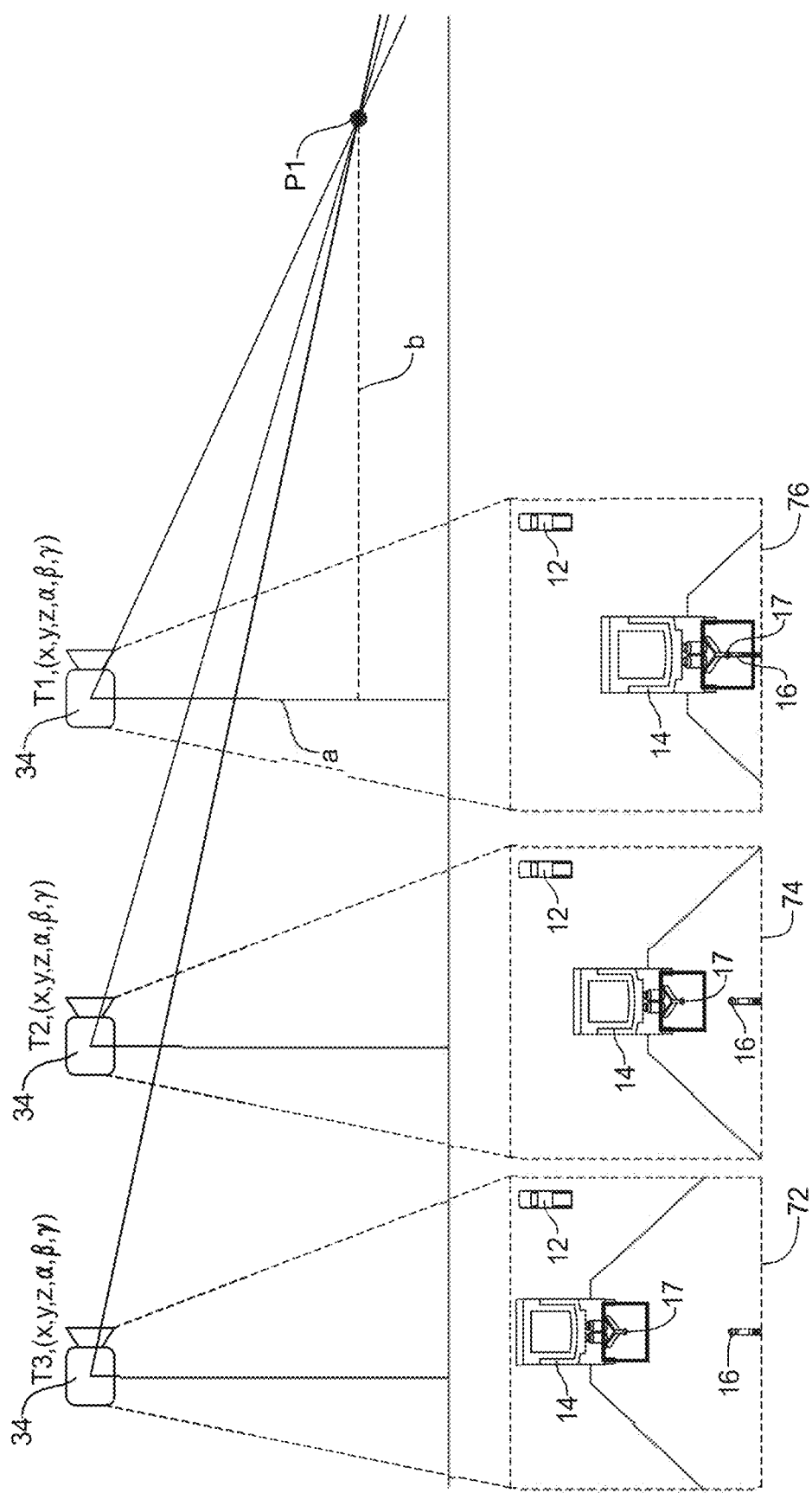
FIG. 4 is a schematic diagram showing camera poses as the vehicle moves over time using the method shown in FIG. 3, in accordance with an exemplary embodiment.

With continuing reference to FIG. 3 and now with additional reference to FIG. 4 which shows exemplary camera poses as the vehicle 12 moves over time, the DTPA 30 uses, for example, a vSLAM algorithm to determine and reconstruct structure and key landmarks in environment 18 using a data stream from the vehicle camera 34 and from the trailer camera 34'. While vSLAM is used throughout the disclosure, it should be understood that other image or video-processing algorithms and/or visual simultaneous localization and mapping applications may be utilized. The vSLAM algorithm uses the optical and/or video data received at block 105 to perform camera pose calculations. Key landmarks include landmarks (e.g., hitch 16, coupler 17, and the like) that are relevant to determining location of the vehicle 12 with respect to the trailer 14. Environment 18 includes structure, key landmarks, and surroundings from a viewpoint of the vehicle camera 34 and trailer camera 34'.

Referring to FIG. 4, for example, a first camera pose 72, a second camera pose 74, and a third camera pose 76 are shown as the vehicle 12 and the camera 34, 34' move over time T1, T2, T3. The camera poses 72, 74, 76 are captured from the data stream from vehicle camera 34 and the trailer camera 34'. The vSLAM algorithm provides estimates for the position and orientation of the camera 34 on vehicle 12 with respect to the environment 18 and with respect to the camera 34' on trailer 14 while simultaneously mapping the environment 18. Vehicle camera 34 and the trailer camera 34' capture images of the environment 18 so that the vSLAM algorithm can extract features and key landmarks, such as the trailer coupler 17 and hitch 16. The vSLAM algorithm also performs loop closure detection for recognizing that the vehicle camera 34 and the trailer camera 34' are returning to a previously captured environment 18 and corrects the drift in the map and the camera pose.

Returning to FIG. 3, once the key landmarks are determined at block 106, the method proceeds to block 108 where the key landmarks from the data stream captured in block 105 are combined. The key landmarks determined at block 104, for example the hitch 16 and the trailer coupler 17, are combined and mapped across consecutive video frames to estimate the motion of the camera 34, 34' and the 3D position of the hitch 16 and the trailer coupler 17 and/or other features in the environment 18. The camera poses 72, 74, 76 captured by camera 34, 34' and the 3D features are combined to form a map of the environment 18 that is updated as new images are captured and processed by system 10 in real time (e.g., actively and continuously).

Figure 5:
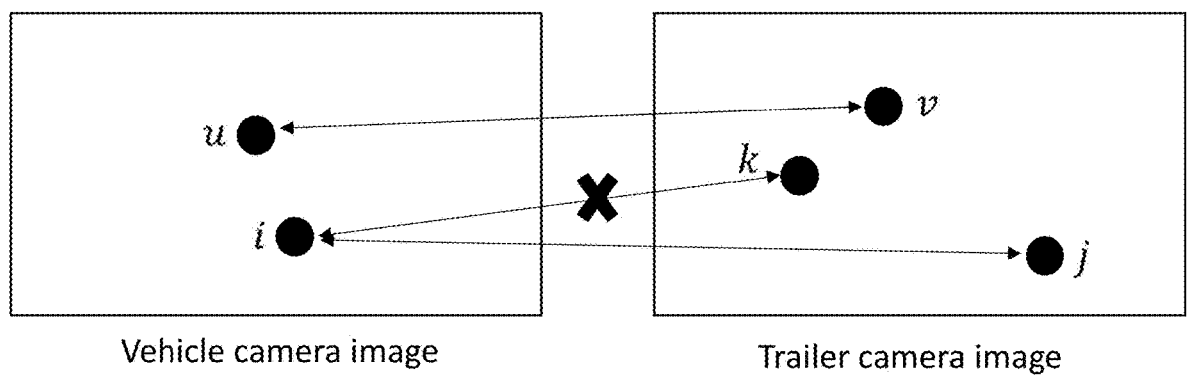
FIG. 5 is a schematic diagram of images captured from a vehicle camera and a trailer camera for determining key landmarks utilized by the trailer detection and trajectory planning application (DTPA), in accordance with an exemplary embodiment.

For example, with continuing reference to FIG. 3 and now with reference to FIG. 5, optical or video data (e.g., an image or camera pose from a video frame) from vehicle camera 34 is received and is shown having identified landmarks u, i. Additionally, optical or video data (e.g., an image or camera pose from a video frame) from trailer camera 34' is received and is shown having identified landmarks v, k, j. Landmark u, determined from an image from the vehicle camera 34, is mapped to landmark v, which is determined from an image from the trailer camera 34'. Landmark i is not mapped to landmark k because the vSLAM algorithm determines that mapping landmark k to landmark i is not feasible or likely. A landmark that is not feasible is determined, for example, when a first landmark image (e.g., landmark i) does not match a second landmark image (e.g., landmark k). Instead, landmark j is mapped to landmark i, and key landmarks u and v are mapped and combined and key landmarks i and j are mapped and combined.

Returning to FIG. 3, at block 110 the controller 20 determines a location of the coupler 17 with respect to the vehicle hitch 16 using the combined key landmarks from block 108. The location of the coupler 17 is estimated using the combined key landmarks in an X, Y, Z coordinate system by measuring the vehicle dynamics as the vehicle 12 moves over time ($\alpha$=pitch, $\beta$=roll, $\gamma$=yaw and angular rotations thereof). For example, the vSLAM algorithm is used to locate the trailer coupler 17 in each of the camera poses 72, 74, 76 shown in FIG. 4 for each time T1, T2, and T3, thus projecting coupler 3D position in each of the images of each of the camera poses 72, 74, 76 to a 2D image. Shown in FIG. 4, location of the hitch 16 relative to camera 34' and the location of the coupler 17 with respect to vehicle camera 34 are determined using a calculated distance between camera 34, 34' and "p1" (e.g., a determined landmark) given that both distance "a" and distance "b" are known. Distance "a" is the vertical height of the camera 34 in the vehicle and distance "b" is the horizontal distance from the camera 34, 34' to p1. The method 100 then proceeds to block 112.

At block 112, the DTPA 30 computes an optimal joint reference trajectory $RT_j$ using the location of the coupler 17 determined at block 110. A reference trajectory $RT_v$ from a perspective of the vehicle camera 34 is computed, and a reference trajectory $RT_c$ from a perspective of the coupler 17 and trailer camera 34' is computed. A reference trajectory $RT_d$ is then computed (using, for example, Euclidean distance, a dynamic time warping algorithm, and the like) by using absolute value of the coupler reference trajectory $RT_c$ subtracted from the vehicle reference trajectory $RT_v$ (i.e., ($RT_d$=|$RT_v$–$RT_c$|) using DTPA 30. An optimal reference trajectory $RT_j$ from the hitch 16 to the coupler 17 is then computed so that $RT_d$ is minimal. Computing of the optimal joint reference trajectory $RT_j$ can be repeated until the vehicle 12 is coupled with the trailer 14. The optimal joint reference trajectory $RT_j$ is computed using the DTPA 30 where the controller 20 is located in the vehicle 12, the trailer 14, and/or network 40, 44 (e.g., a remote computer). The method 100 then proceeds to block 114.

At block 114, the DTPA 30 provides navigation assistance in real time based on the joint reference trajectory $RT_j$ computed at block 112. The DTPA 30 provides navigation assistance in the form of verbal or visual instructions to an operator via the HMI 46 or HUD 52 for directing and steering the vehicle 12. For example, visual instructions can be displayed on the HMI 46 indicating a direction to turn a steering wheel and indicating a speed for the operator to operate the vehicle 12. In another aspect, the DTPA 30 provides navigation assistance by providing navigation instructions to and directing an automated or a semi-automated steering system having an actuator to rotate a passenger vehicle steering wheel. The method 100 then ends.

The system 10 and method 100 for detecting the trailer coupler 17 providing trajectory planning and navigation assistance of the present disclosure offers several advantages over prior art systems. These include: detecting a coupler 17 from a range of greater than 3 feet, eliminating the need for a coupler 17 with a marker by using a trailer camera 34', and using bi-directional detection and trajectory planning, thereby improving vehicle and trailer coupling for an operator.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for detecting a trailer coupler on a trailer to assist with coupling the trailer coupler to a vehicle hitch, the system comprising:
    one or more human-machine interfaces (HMIs) disposed within a vehicle;
    a vehicle camera disposed on the vehicle and detecting an environment surrounding the vehicle;
    a trailer camera disposed on the trailer and detecting an environment surrounding the trailer;
    a vehicle-to-infrastructure (V2I) communication network;
    one or more controllers, each of the one or more controllers having a processor, a memory, and one or more input/output (I/O) ports, the one or more I/O ports in communication with the vehicle camera and the trailer camera, and in communication the one or more HMIs via the V2I communication network, the memory storing instructions including a trailer detection and trajectory planning application (DTPA) which, when executed by the processor, perform the following:
    initialize a data stream from the vehicle camera and the trailer camera;
    simultaneously capture the data stream from the vehicle camera and from the trailer camera;
    determine key landmarks in the data stream from the vehicle camera and in the data stream from the trailer camera;
    combine the key landmarks;
    determine a coupler location with respect to the vehicle hitch using the combined key landmarks;
    compute a joint reference trajectory using the coupler location with respect to a hitch location; and
    provide navigation assistance in real time based on the joint reference trajectory.

2. The system of claim 1, wherein the trailer camera is a cell phone camera in communication with the mobile application.

3. The system of claim 1, wherein the one or more controllers is located in the vehicle and at the trailer.

4. The system of claim 1, wherein the one or more controllers is located at a remote computing system.

5. The system of claim 1, further comprising instructions which, when executed by the processor, requests an operator to provide an input to the HMI to confirm initialization of the DTPA.

6. The system of claim 1, wherein determining the key landmarks in the data stream from the vehicle camera and the data stream from the trailer camera includes performing key landmark detection and dimensional calculations on the captured data stream to determine the coupler location in real time.

7. The system of claim 1, further comprising instructions which, when executed by the processor, present navigation assistance including at least one of verbal or visual navigation assistance to the HMI to guide the vehicle hitch to the trailer coupler.

8. The system of claim 1, further comprising instructions which, when executed by the processor, provide automated steering assistance.

9. A method for detecting location of a trailer coupler on a trailer and assisting with coupling of the trailer coupler to a vehicle hitch on a vehicle, the method comprising:
    initializing a data stream from a vehicle camera and a trailer camera;
    capturing the data stream from the vehicle camera and from the trailer camera;
    determining key landmarks in the data stream from the vehicle camera and in the data stream from the trailer camera;
    combining the key landmarks;
    determining a coupler location with respect to the vehicle hitch using the combined key landmarks;
    computing a joint reference trajectory using the coupler location with respect to a hitch location; and
    providing navigation assistance in real time based on the joint reference trajectory.

10. The method of claim 9, further comprising:
    requesting an operator to provide an input to one or more human-machine interfaces (HMIs).

11. The method of claim 9, further comprising:
    providing a remote computing system, wherein one or more input/output (I/O) ports are in communication with the remote computing system via a vehicle-to-infrastructure (V2I) communication network.

12. The method of claim 9, wherein capturing the data stream includes simultaneously capturing video stream from the vehicle camera and from the trailer camera.

13. The method of claim 9, wherein presenting the navigation assistance in real time includes presenting at least one of verbal or visual assistance using one or more human-machine interfaces.

14. The method of claim 9, wherein presenting the navigation assistance in real time includes providing steering assistance.

15. The method of claim 9, wherein determining the key landmarks in the data stream from the vehicle camera and in the data stream from the trailer camera includes using a processor in the vehicle.

16. The method of claim 9, wherein determining the key landmarks in the data stream from the vehicle camera and in the data stream from the trailer camera includes using a processor in the vehicle and a processor in the trailer.

17. The method of claim 9, wherein determining the key landmarks in the data stream from the vehicle camera and in the data stream from the trailer camera includes using a controller in a remote computer.

18. The method of claim 9, wherein the trailer camera includes a mobile device camera located at the trailer coupler.

19. A method for detecting location of a trailer coupler on a trailer and assisting with coupling of the trailer coupler to a vehicle hitch on a vehicle, the method comprising:
    requesting an operator to provide an input to one or more human-machine interfaces (HMIs);

initializing a data stream from a vehicle camera and a trailer camera;

capturing the data stream from the vehicle camera and from the trailer camera;

determining key landmarks in the data stream from the vehicle camera and in the data stream from the trailer camera in real time;

combining the key landmarks determined from the data stream from the vehicle camera and from the data stream from the trailer camera;

determining a coupler location with respect to the vehicle hitch using combined key landmarks;

actively and dynamically computing a joint reference trajectory using the coupler location with respect to a hitch location; and actively and continuously presenting navigation assistance in real time based on the joint reference trajectory, wherein the navigation assistance includes automated steering assistance.

20. The method of claim 19, wherein the navigation assistance includes at least one of verbal or visual instruction displayed on the one or more human-machine interfaces (HMIs).

\* \* \* \* \*